(12) United States Patent
Sasaki et al.

(10) Patent No.: US 12,164,648 B2
(45) Date of Patent: Dec. 10, 2024

(54) BACKDOOR INSPECTION DEVICE, USER DEVICE, SYSTEM, METHOD, AND NON-TRANSITORY COMPUTER-READABLE MEDIUM

(71) Applicant: NEC Corporation, Tokyo (JP)

(72) Inventors: Takayuki Sasaki, Tokyo (JP); Yusuke Shimada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 492 days.

(21) Appl. No.: 17/632,596

(22) PCT Filed: Jul. 6, 2020

(86) PCT No.: PCT/JP2020/026366
§ 371 (c)(1),
(2) Date: Feb. 3, 2022

(87) PCT Pub. No.: WO2021/029160
PCT Pub. Date: Feb. 18, 2021

(65) Prior Publication Data
US 2022/0277083 A1 Sep. 1, 2022

(30) Foreign Application Priority Data
Aug. 9, 2019 (WO) .................. PCT/JP2019/031648

(51) Int. Cl.
*G06F 21/57* (2013.01)
*H04L 9/32* (2006.01)

(52) U.S. Cl.
CPC .......... *G06F 21/577* (2013.01); *H04L 9/3263* (2013.01); *G06F 2221/033* (2013.01)

(58) Field of Classification Search
CPC ............ G06F 21/577; G06F 2221/033; G06F 21/556; H04L 9/3263
See application file for complete search history.

(56) References Cited

U.S. PATENT DOCUMENTS 9,811,665 B1 * 11/2017 Xu .................. G06F 21/562
10,581,874 B1 * 3/2020 Khalid ................ H04L 63/1425
(Continued)

FOREIGN PATENT DOCUMENTS

| JP | H11-282672 A | 10/1999 |
|---|---|---|
| JP | 2001-236314 A | 8/2001 |

(Continued)

OTHER PUBLICATIONS

International Search Report for PCT Application No. PCT/JP2020/026366, mailed on Sep. 29, 2020.

*Primary Examiner* — Harunur Rashid
(74) *Attorney, Agent, or Firm* — Sughrue Mion, PLLC

(57) ABSTRACT

The present disclosure aims to provide a backdoor inspection device, a user device, a system, a method, and a non-transitory computer-readable medium that enable a third party to easily verify whether software contains a backdoor. A backdoor inspection device according to the present disclosure includes: a backdoor presuming means for analyzing a function and a structure of the software, performing backdoor inspection on the software, and identifying a presumed code that is presumed to be the backdoor from the software; and a certificate issuance means for issuing a certificate that includes information about the backdoor inspection and information that associates the information about the backdoor inspection with the software.

11 Claims, 10 Drawing Sheets

(56) References Cited

U.S. PATENT DOCUMENTS

| | | |
|---|---|---|
| 2009/0210719 A1 | 8/2009 | Yoshida |
| 2017/0147338 A1 | 5/2017 | Jackson et al. |
| 2019/0053053 A1* | 2/2019 | Skvortsov ............ G06Q 20/108 |
| 2020/0184079 A1 | 6/2020 | Morita et al. |

FOREIGN PATENT DOCUMENTS

| | | |
|---|---|---|
| JP | 2007-095043 A | 4/2007 |
| JP | 2009-098851 A | 5/2009 |
| JP | 2009-199147 A | 9/2009 |
| JP | 2019-500676 A | 1/2019 |
| JP | 2019-036273 A | 3/2019 |
| WO | 2019/026137 A1 | 2/2019 |

* cited by examiner

BACKDOOR INSPECTION DEVICE, USER DEVICE, SYSTEM, METHOD, AND NON-TRANSITORY COMPUTER-READABLE MEDIUM

This application is a National Stage Entry of PCT/JP2020/026366 filed on Jul. 6, 2020, which claims priority from Japanese Patent Application PCT/JP2019/031648 filed on Aug. 9, 2019, the contents of all of which are incorporated herein by reference, in their entirety.

TECHNICAL FIELD

The present disclosure relates to a backdoor inspection device, a user device, a system, a method, and a non-transitory computer-readable medium, in particular, to a backdoor inspection device, a user device, a system, a method, and a non-transitory computer-readable medium that enable a third party to easily verify whether software contains a backdoor.

BACKGROUND ART

In recent years, infrastructures and enterprise systems that support daily lives have become complicated, and therefore such infrastructures and enterprise systems are difficult to be constructed only with devices (equipment) of a single company. Thus, devices are procured from outside suppliers, and the procured devices are combined or incorporated and constitute the infrastructure or enterprise system. When an infrastructure or an enterprise system is constructed, manufacturers of the procured devices and a manufacturing and distribution chain are handled as being assumed to be trustful. However, there have been many reports of events (incidents) in which a hidden or unexpected function that a user (a person who embeds devices) is not aware of in terms of software, firmware, and hardware of such embedded devices is found. Therefore, the assumption that the device manufacturers and the manufacturing and distribution chain are trustful is no longer valid, and, for example, a method of detecting a rogue function in software becomes necessary. Note that a term "backdoor" refers to a hidden or additional function that a user is not aware of and that is a rogue function in software.

Patent Literature 1 discloses a program verification system that includes: a program verification means for verifying whether a program to be verified, which is input as a program that runs in a secure environment, contains a program execution function being a function that is triggered by an instruction in the program and executes a new program in the same environment, and/or whether the program to be verified or a protection mechanism of a secure environment where the program runs contains an external input attack protection function being a function that protects against an attack caused by external data input during program execution; and a signature means for assigning a signature to the program, based on a verification result by the program verification means.

Patent Literature 2 discloses that a computer system, a method, or a computer-readable medium controls a potentially unacceptable software component directed to a software repository. Patent Literature 2 also discloses that a predefined application or repository policy being associated with a repository or an application predefines a risk and, for each risk, an action to be taken on the risk, and that the action can be defined as a pass-through or not-pass-through action and is a predefined program step defined in the policy.

Further, Patent Literature 2 discloses that, when a component is not new to the repository or the application, the component is passed through for normal processing, and when a component is new, a risk matching the software component is determined, and, for the matched risk, an action is taken as defined in the predefined policy.

Patent Literature 3 discloses that a PC on an application side retains a specific identification value and a cryptographic identification value of the application, retains an own certificate, and retains a specific function and user information, a private key, and the like in a security area that is not readable from outside. Patent Literature 3 discloses that the private key is associated to a public key stored in a certificate and that the application transmits the certificate and the above-described specific identification value and cryptographic identification value to another application. Patent Literature 3 also discloses that the application receives another certificate, specific identification value, and cryptographic identification value from the another application, determines legitimacy of the another application, based on these values, and permits communication with the another application when the legitimacy is determined. The certificate described in Patent Literature 3 is a certificate containing a public key and is not a backdoor inspection certificate indicating a result of backdoor inspection.

Patent Literature 4 discloses that a digitally signed hash value that cannot be tampered can be recorded for each daemon program, and therefore it is possible to easily detect a backdoor that performs unauthorized communication even when the daemon program is replaced with the backdoor. Patent Literature 4 discloses that the digital signature can also be made to be the daemon program itself, a log file or a packet being output by the daemon program, and a configuration file specific to the daemon program. Patent Literature 4 discloses that daemon programs can be monitored at all times by periodically exchanging digitally signed hash values between the daemons, even after the daemon programs have authenticated each other and established connections on the TCP layer. Although Patent Literature 4 discloses inspecting for file replacement, based on a certificate, Patent Literature 4 does not disclose inspecting for a backdoor, based on software configuration information.

CITATION LIST

Patent Literature

Patent Literature 1: International Patent Publication No. WO2019/026137
Patent Literature 2: Published Japanese Translation of PCT International Publication for Patent Application, No. 2019-500676
Patent Literature 3: Japanese Unexamined Patent Application Publication No. 2009-199147
Patent Literature 4: Japanese Unexamined Patent Application Publication No. 2001-236314

SUMMARY OF INVENTION

Technical Problem

As described above, there is a problem that a method for detecting a rogue function in software is required. In addition, there is also a problem that a third party cannot easily verify whether software contains a backdoor. Neither Patent Literature 1 nor Patent Literature 2 discloses a solution to these problems.

An object of the present disclosure is to provide a backdoor inspection device, a user device, a system, a method, and a non-transitory computer-readable medium that solve any of the above-described problems.

Solution to Problem

A backdoor inspection device according to the present disclosure includes: a backdoor presuming means for analyzing a function and a structure of software, performing backdoor inspection on the software, and identifying a presumed code that is presumed to be the backdoor from the software; and a certificate issuance means for issuing a certificate that includes information about the backdoor inspection and information that associates the information about the backdoor inspection with the software.

A system according to the present disclosure includes: a backdoor inspection device that performs backdoor inspection on software; a database that registers a certificate issued by the backdoor inspection device; and a user device that verifies a counterpart device of communication, based on the certificate, wherein the backdoor inspection device includes: a backdoor presuming means for analyzing a function and a structure of the software, performing the backdoor inspection on the software, and identifying a presumed code that is presumed to be the backdoor from the software; and a certificate issuance means for issuing the certificate that includes information about the backdoor inspection and information that associates the information about the backdoor inspection with the software, the database includes: a registration means for registering the certificate as trust information; and a transmission means for transmitting information about the backdoor inspection that includes a result of the backdoor inspection, based on software configuration information including information of the software, the user device includes a communication means for receiving the software configuration information of the software installed in the counterpart device of communication from the counterpart device; and a communication counterpart verification means for acquiring a result of the backdoor inspection associated to the information of the software from the database and determining whether to permit communication with the counterpart device, based on the acquired result of the backdoor inspection, and the communication means communicates with the counterpart device when the communication counterpart verification means determines to permit communication with the counterpart device.

A system according to the present disclosure includes: a backdoor inspection device that performs backdoor inspection on software; a database that registers a certificate issued by the backdoor inspection device; a user device that verifies a counterpart device of communication, based on the certificate; and the counterpart device that communicates with the user device, wherein the backdoor inspection device includes: a backdoor presuming means for analyzing a function and a structure of the software, performing the backdoor inspection on the software, and identifying a presumed code that is presumed to be the backdoor from the software; and a certificate issuance means for issuing the certificate that includes information about the backdoor inspection and information that associates the information about the backdoor inspection with the software, the database includes: a registration means for registering the certificate as trust information; and a transmission means for transmitting information about the backdoor inspection that includes a result of the backdoor inspection, based on software configuration information including information of the software, the counterpart device includes: an acquisition means for acquiring a result of the backdoor inspection associated to the software configuration information installed in the counterpart device from the database; and an output means for outputting the acquired result of the backdoor inspection to the user device, the user device includes: a communication means for acquiring a result of the backdoor inspection from the counterpart device; and a communication counterpart verification means for determining whether to permit communication with the counterpart device, based on the acquired result of the backdoor inspection, and the communication means communicates with the counterpart device when the communication counterpart verification means determines to permit communication with the counterpart device.

A method according to the present disclosure includes: analyzing a function and a structure of software, performing backdoor inspection on the software, and identifying a presumed code that is presumed to be the backdoor from the software; and issuing a certificate that includes information about the backdoor inspection and information that associates the information about the backdoor inspection with the software.

A non-transitory computer-readable medium according to the present disclosure stores a program that causes a computer to perform: analyzing a function and a structure of software, performing backdoor inspection on the software, and identifying a presumed code that is presumed to be the backdoor from the software; and issuing a certificate that includes information about the backdoor inspection and information that associates the information about the backdoor inspection with the software.

A user device according to the present disclosure includes: a communication means for receiving, from a counterpart device of communication, software configuration information that includes information of software installed in the counterpart device, and receiving, from a database via the counterpart device, a result of backdoor inspection associated to the information of the software; and a communication counterpart verification means for determining whether to permit communication with the counterpart device, based on the received result of the backdoor inspection, wherein the communication means communicates with the counterpart device when the communication counterpart verification means determines to permit communication with the counterpart device.

A system according to the present disclosure includes: a backdoor inspection device that performs backdoor inspection on software, a database that registers a backdoor inspection certificate issued by the backdoor inspection device, and a user device that verifies a counterpart device of communication, based on the backdoor inspection certificate, wherein the backdoor inspection device includes: a backdoor presuming means for analyzing a function and a structure of the software, performing the backdoor inspection on the software, and identifying a presumed code that is presumed to be the backdoor from the software; and a certificate issuance means for issuing the backdoor inspection certificate that includes information about the backdoor inspection and information that associates the information about the backdoor inspection with the software, the database includes: a registration means for registering the backdoor inspection certificate as trust information; and a transmission means for transmitting information about the backdoor inspection that includes a result of the backdoor inspection, based on software configuration information including information of the software, the user device includes: a communication means for receiving, from the counterpart device of communication, the software configuration information of the software installed in the counterpart device, and receiving, from the database via the counterpart device, a result of the backdoor inspection associated to the information of the software; and a communication counterpart verification means for determining whether to permit communication with the counterpart device, based on the received result of the backdoor inspection, and the communication means communicates with the counterpart device when the communication counterpart verification means determines to permit communication with the counterpart device.

Advantageous Effects of Invention

According to the present disclosure, it is possible to provide a backdoor inspection device, a user device, a system, a method, and a non-transitory computer-readable medium that enable a third party to easily verify whether software contains a backdoor.

DESCRIPTION OF EMBODIMENTS

The following will describe example embodiments of the present invention with reference to the drawings. In each drawing, the same or corresponding elements are designated by the same signs, and duplicate description will be omitted as necessary for clarification of the description.

First Example Embodiment

The outline of the configuration of a backdoor inspection device according to a first example embodiment will be described.

Figure 1:
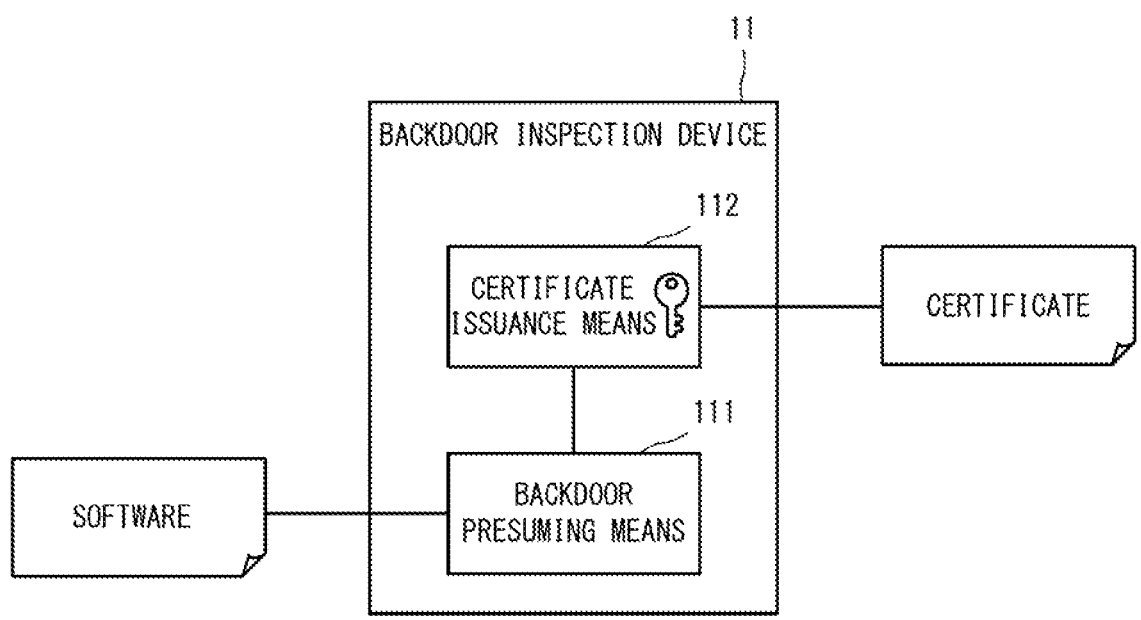
FIG. 1 is a block diagram illustrating a backdoor inspection device according to a first example embodiment.

FIG. 1 is a block diagram illustrating the backdoor inspection device according to the first example embodiment.

As illustrated in FIG. 1, the backdoor inspection device 11 of the first example embodiment comprises a backdoor presuming means 111 and a certificate issuance means 112.

The backdoor presuming means 111 analyzes the function and structure of software, performs backdoor inspection on the software, and identifies a presumed code that is presumed to be the backdoor from the software. The term "backdoor" refers to a hidden or additional function that the user who uses the equipment is not aware of and that is a rogue or undesirable function in the software. Analyzing the function and structure of software and identifying the presumed code that is presumed to be a backdoor from the software may be referred to as "backdoor analysis." The presumed code is a code that is highly suspicious and likely to be a backdoor.

The certificate issuance means 112 issues a certificate that includes information about the backdoor inspection and information that associates the information about the backdoor inspection with the software. The software analyzed by the backdoor presuming means 111 is, for example, software installed in a counterpart device that communicates with a user device 12b used by the user. The information about the backdoor inspection includes, for example, information such as whether there is a backdoor in the software.

The backdoor inspection device 11 issues a certificate that includes information about backdoor inspection and information that associates the information about the backdoor inspection with the software. A third party can verify whether software contains a backdoor by acquiring the certificate and acquiring the information about the backdoor inspection that is associated with the software. In this way, according to the first example embodiment, it is possible to provide a backdoor inspection device that enables a third party to easily verify whether software contains a backdoor.

Note that the code may be a source code or an execution code. A plurality of codes may be collectively referred to as a code block.

The details of the configuration of the backdoor inspection device according to the first example embodiment will be described.

Figure 2:
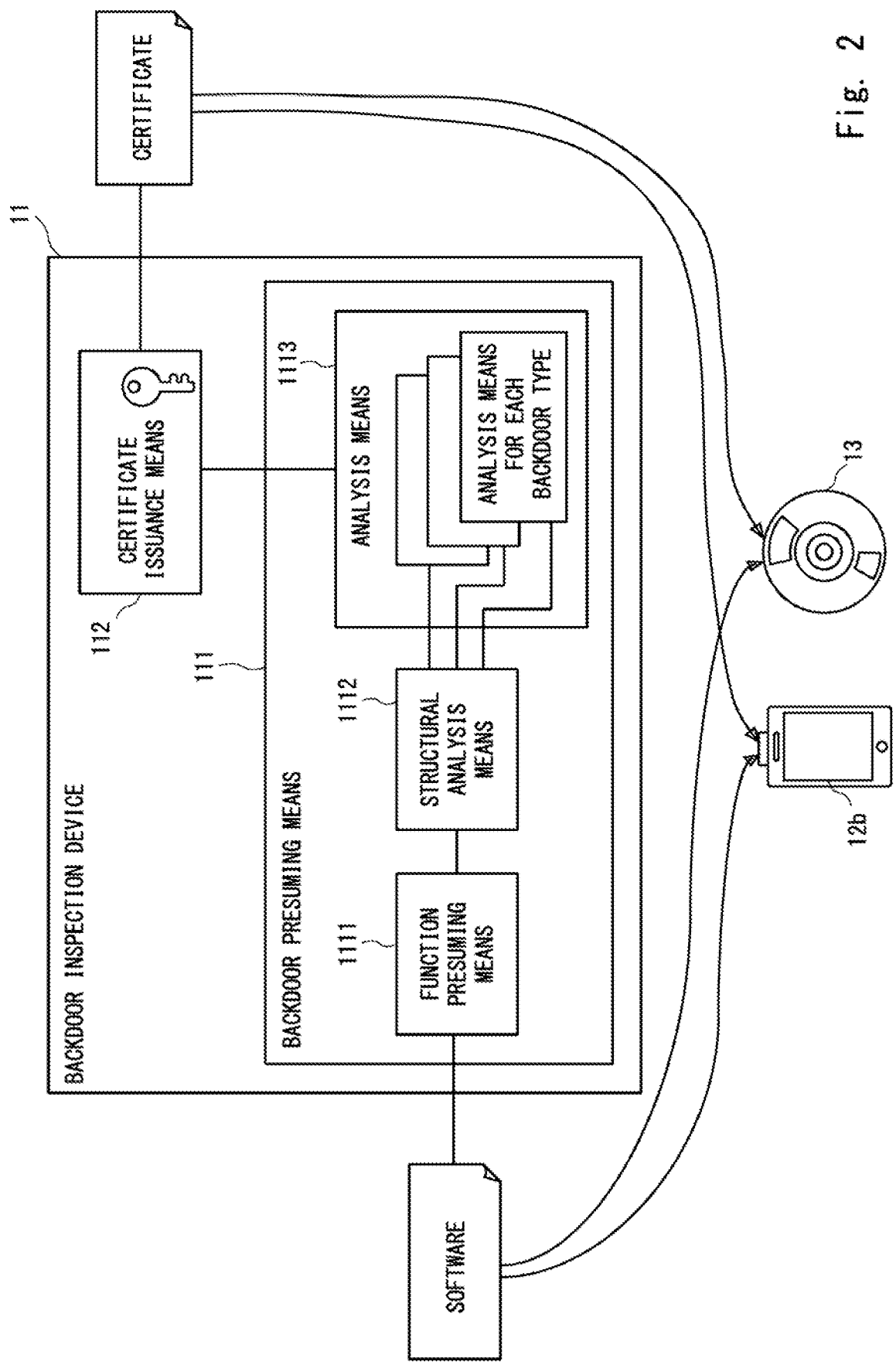
FIG. 2 is a block diagram illustrating the backdoor inspection device according to the first example embodiment.

FIG. 2 is a block diagram illustrating the backdoor inspection device according to the first example embodiment.

FIG. 2 illustrates the details of FIG. 1.

As illustrated in FIG. 2, the backdoor presuming means 111 of the backdoor inspection device 11 includes a function presuming means 1111, a structural analysis means 1112, and an analysis means 1113.

The function presuming means 1111 presumes a specific function, such as an interface function, an authentication function, and a command parser function, in the software.

The structural analysis means 1112 reveals the structure of the entire software, based on a control flow, starting from the presumed specific function. Specifically, the structural analysis means 1112 extracts a plurality of functions included in the control flow and presumes each function. The structural analysis means 1112 separates the presumed functions for each type.

The analysis means 1113 has an analysis means for each type of backdoor. The analysis means 1113 compares the separated function and the associated backdoor for each type of backdoor by using the analysis means for each type of backdoor. As the result of the comparison, the analysis means 1113 presumes whether the function is a backdoor and identifies a presumed code that is presumed to be a backdoor in the software. Alternatively, the analysis means 1113 may inspect the entire software regardless of individual functions.

The certificate issued by the certificate issuance means 112 includes information indicating whether a backdoor is contained in the software, that is, the result of the backdoor inspection. The result of the backdoor inspection includes the location information of the presumed code in the software when a backdoor is contained in the software.

The certificate may include at least one of the hash value of the software, the name of the software, and the signature of the own device (the backdoor inspection device 11) that inspected the backdoor. By including the signature of the backdoor inspection device 11 in the certificate, it is possible to prove that the backdoor inspection device 11 has performed the backdoor inspection. The certificate may also include information indicating that the backdoor inspection has been performed.

The certificate may include at least one of the following information: the version of the backdoor inspection device 11 that performed the backdoor inspection, the ID of the analyst who performed the analysis by using the backdoor inspection device 11, the signature of the analyst, the organization to which the analyst belongs, and the name of the analyst. The certificate may also include the date of the analysis.

The certificate may be embedded (may be packaged) in the software. Then, the software in which the certificate is embedded may be downloaded to the user device 12b that the user uses or to a storage medium 13. This allows the user to use the user device 12b after confirming that no backdoor is contained in the software, based on the certificate in the software of the user device 12b.

Second Example Embodiment

The configuration of a system according to a second example embodiment will be described.

Figure 3:
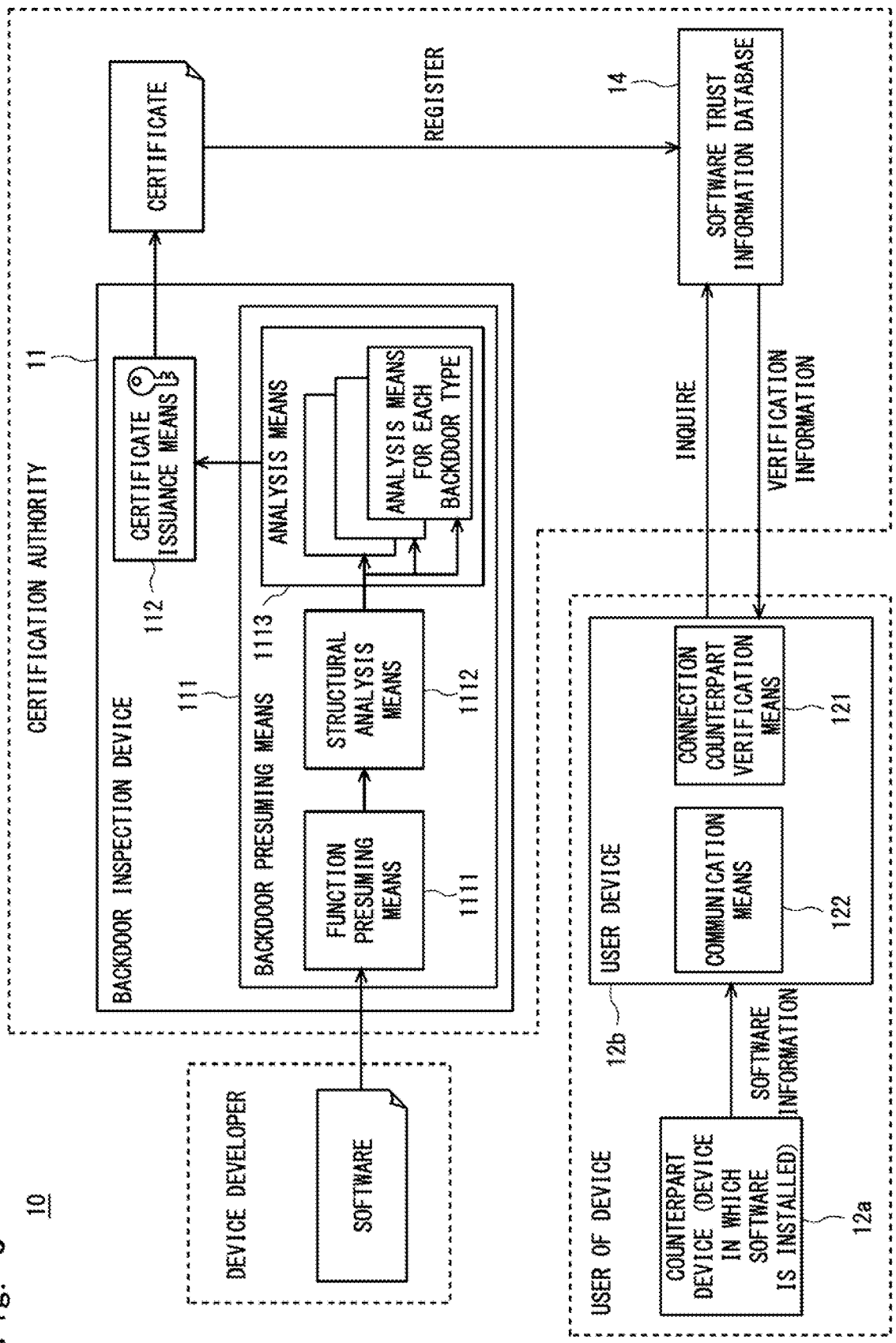
FIG. 3 is a block diagram illustrating a system according to a second example embodiment.

FIG. 3 is a block diagram illustrating a system according to the second example embodiment.

As illustrated in FIG. 3, the system 10 comprises a backdoor inspection device 11, a database 14, and a user device 12b.

The backdoor inspection device 11 includes a backdoor presuming means 111 and a certificate issuance means 112.

The backdoor presuming means 111 analyzes the function and structure of software developed by a device developer, performs backdoor inspection on the software, and identifies a presumed code that is presumed to be a backdoor from the software. The certificate issuance means 112 issues a certificate that includes information about the backdoor inspection and information that associates the information about the backdoor inspection with the software.

The database 14 has a registration means (not illustrated) and a transmission means (not illustrated). The registration means registers the certificate issued by the backdoor inspection device 11 as trust information. The transmission means transmits information about the inspection, including the result of the backdoor inspection, based on the software configuration information that includes the information of the software. The result of the backdoor inspection is referred to as the verification information or verification result. The database 14 may be, for example, a server device.

The user device 12b includes a communication counterpart verification means 121 and a communication means 122. The communication means 122 receives the software configuration information of the software installed in the counterpart device 12a from the counterpart device 12a.

The communication counterpart verification means 121 inquires the database 14 of the result of the backdoor inspection on the software that is installed in the communication counterpart device 12a and used by the communication counterpart device 12a.

The communication counterpart verification means 121 acquires the result of the backdoor inspection associated to the information of the software used by the communication counterpart device 12a from the database 14. The communication counterpart verification means 121 determines whether to permit communication with the counterpart device 12a, based on the result of the backdoor inspection.

The communication counterpart verification means 121 determines not to permit communication with the counterpart device 12a when a backdoor is contained in the software. The communication counterpart verification means 121 determines to permit communication with the counterpart device 12a when no backdoor is contained in the software.

The communication means 122 communicates with the counterpart device 12a when the communication counterpart verification means 121 determines to permit communication with the counterpart device 12a.

In this way, when a user uses a user device 12b that is connected to a network, the user can easily verify whether a backdoor is contained in the software that is installed in a counterpart device 12a. As the result, the user can use only a highly trustful and safe device as a counterpart device 12a.

Note that the backdoor inspection device 11 and the database 14 may be owned by a certification authority, and the certification authority may verify whether a backdoor is contained in software.

Further, the user device 12b may acquire the certificate from the database 14, identify software containing a backdoor, based on the certificate, and not select the device in which the identified software is installed as the communication counterpart device 12a.

In the example illustrated in FIG. 3, when the communication counterpart device 12a and the user device 12b directly communicate with each other, the permissibility of the communication is determined by presence or absence of a backdoor without limitation. Even when the communication counterpart device 12a and the user device 12b do not directly communicate with each other, the user device 12b may determine (judge) the permissibility of a connection.

Specifically, the communication counterpart verification means 121 of the user device 12b determines not to permit communication between the counterpart device 12a and an external server (not illustrated) when a backdoor is contained in the software. The communication counterpart verification means 121 determines to permit communication between the counterpart device 12a and an external server when no backdoor is contained in the software. The counterpart device 12a may communicate with the server when the communication counterpart verification means 121 determines to permit communication between the counterpart device 12a and the server. In other words, when the counterpart device 12a communicates with the server, the counterpart device 12a may communicate with the server only when the counterpart device 12a receives determination of the connection permission from the user device 12b and the server is determined not to contain a backdoor.

Specifically, when the user device 12b has confirmed that no backdoor is contained in the software installed in the counterpart device 12a, the user device 12b issues a first token indicating that the counterpart device 12a has passed the backdoor inspection. The counterpart device 12a presents a second token when the counterpart device 12a accesses the server. The server may communicate with the counterpart device 12a when the server has confirmed that the second token presented by the counterpart device 12a is the first token (a legitimate token) issued by the user device 12b.

There is also a method that does not use tokens as described above. Specifically, when the user device 12b has confirmed that no backdoor is contained in the software installed in the counterpart device 12a, the user device 12b notifies the server of an identifier for identifying the counterpart device 12a. The server may communicate only with a device having the notified identifier. The identifier includes at least one of an IP address and a MAC address. That is, the user device 12b may notify the server of an IP address, a MAC address, or the like of the counterpart device 12a that has been confirmed to be free from backdoor, and the server may accept connections only from a device having the notified IP address or MAC address.

Alternatively, as in a quarantine network, a network switch may be used to control the permissibility of connections. When new equipment (for example, a counterpart device 12a) is connected to the network, the network switch (not illustrated) controls communication so that the counterpart device 12a can communicate only with the user device 12b. Specifically, the user device 12b inspects whether there is a backdoor in the software installed in the counterpart device 12a in the above-described manner. When the user device 12b has confirmed that no backdoor is contained in the software installed in the counterpart device 12a, the user device 12b may instruct the network switch to release the restriction on communication of the counterpart device 12a.

The user device 12b may issue a token to the counterpart device 12a to release the restriction on communication of the counterpart device 12a, rather than directly sending an instruction to the network switch to release the restriction on communication of the counterpart device 12a. The counterpart device 12a may transmit the issued token to the network switch. The network switch may receive the transmitted token and release the restriction on communication of the counterpart device 12a.

The operation of the system according to the second example embodiment will be described.

Figure 4:
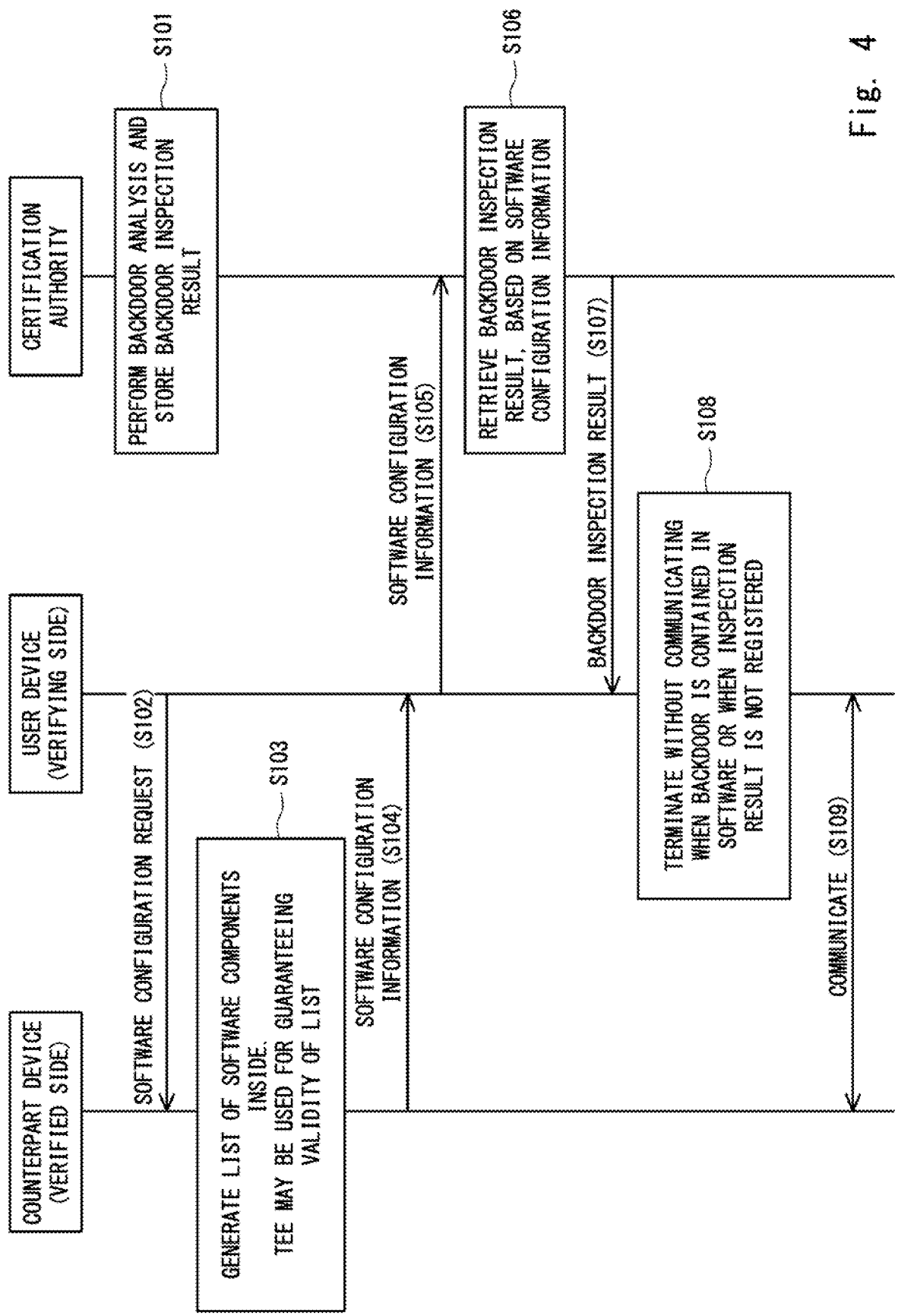
FIG. 4 is a sequence diagram illustrating the operation of the system according to the second example embodiment.

FIG. 4 is a sequence diagram illustrating the operation of the system according to the second example embodiment.

Figure 5:
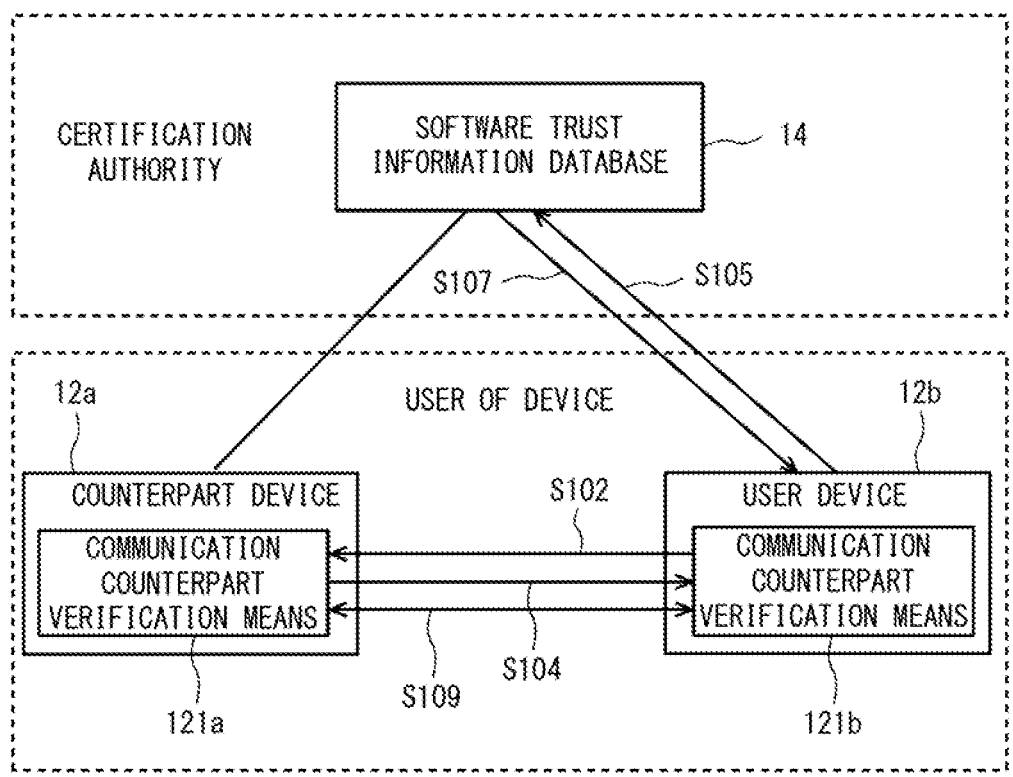
FIG. 5 is a diagram illustrating the operation of the system according to the second example embodiment.

FIG. 5 is a diagram illustrating the operation of the system according to the second example embodiment.

Figure 6:
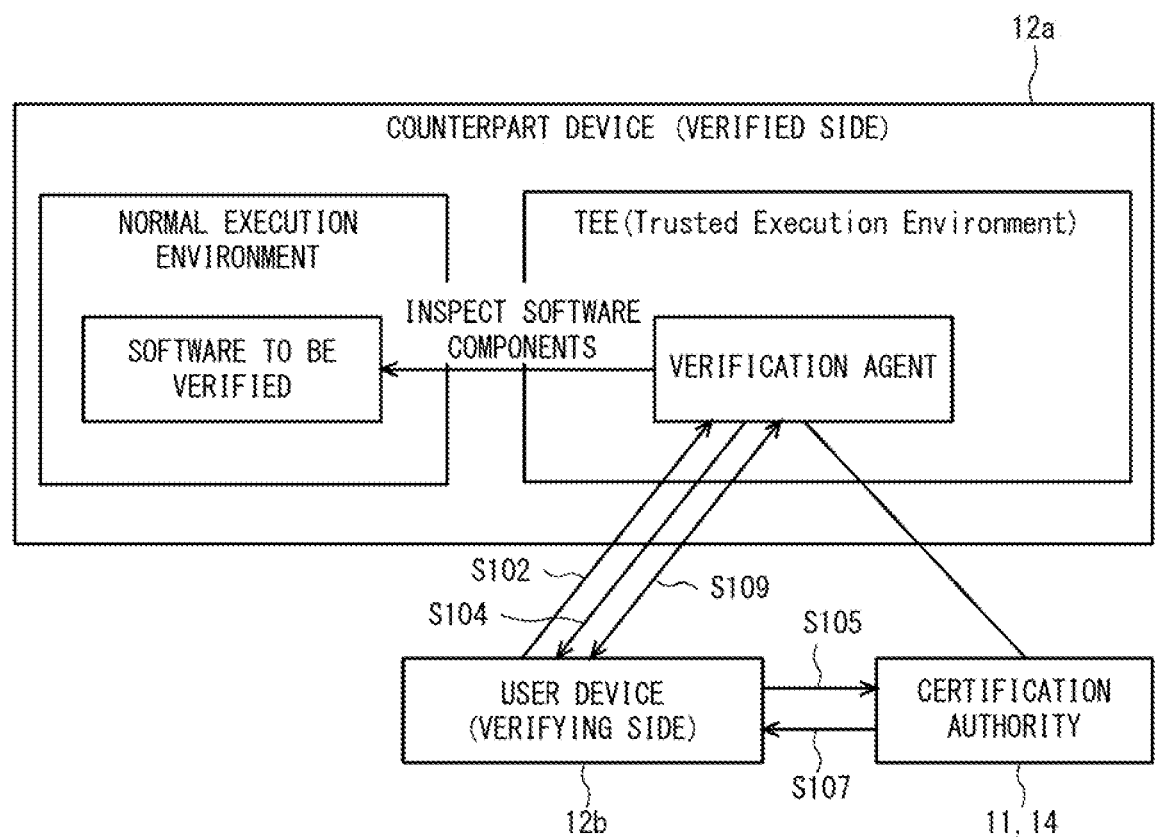
FIG. 6 is a block diagram illustrating a user device according to the second example embodiment.

FIG. 6 is a block diagram illustrating the user device according to the second example embodiment.

FIG. 6 illustrates a block diagram of the counterpart device 12a that is the side to be verified.

Figure 7:
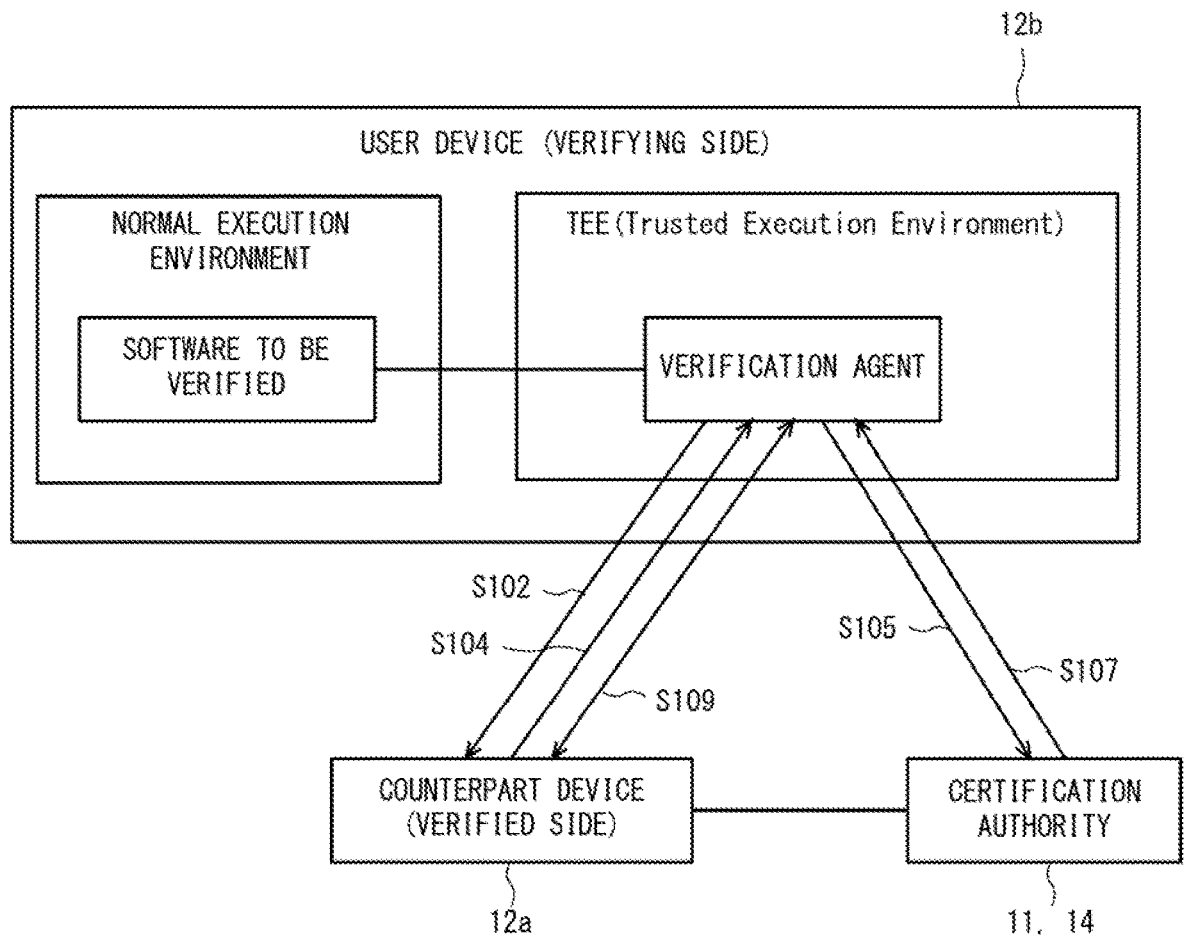
FIG. 7 is a block diagram illustrating a user device according to the second example embodiment.

FIG. 7 is a block diagram illustrating the user device according to the second example embodiment.

FIG. 7 illustrates a block diagram of the user device 12b that is the side to verify.

As illustrated in FIG. 4, at a certification authority, a backdoor inspection device 11 performs backdoor analysis, and a database 14 stores (registers) a certificate including the result of the backdoor inspection (Step S101). The database 14 may be a general database or a distributed database such as a blockchain. The database may also be referred to as a software trust information database.

As illustrated in FIGS. 4 to 7, the user device 12b transmits a software configuration request to the communication counterpart device 12a to request software configuration information including information of the software installed in the counterpart device 12a (Step S102).

The counterpart device 12a generates a list of software components inside its own device (Step S103). At this time, the counterpart device 12a may generate the list by using a Trusted Execution Environment (TEE) in order to guarantee the validity of the list. That is, a verification agent deployed in the TEE may investigate software components for the software to be verified and generate a list of software components.

The counterpart device 12a transmits the software configuration information including the generated list to the user device 12b (Step S104).

The user device 12b receives the software configuration information (Step S104) and transmits the received software configuration information to the certification authority to inquire about the result of the backdoor verification (Step S105).

The certification authority retrieves the result of the backdoor verification, based on the software configuration information including the software information (Step S106).

The certification authority transmits the result of the backdoor verification retrieved based on the software configuration information to the user device 12b (Step S107).

The user device 12b acquires the result of the backdoor inspection from the certification authority (Step S107). Based on the acquired backdoor verification result, the user device 12b terminates without communicating with the counterpart device 12a when a backdoor is contained in the software or when the inspection result is not registered (Step S108).

The user device 12b communicates with the counterpart device 12a when no backdoor is contained in the software (Step S109).

When the user device 12b communicates with the counterpart device 12a, each device acquires information of the software of the communicating peer from the certification authority and can communicate after confirming that the software is free from backdoors.

Note that a verification agent that is deployed inside the TEE for creating software configuration information may be verified for tampering by using a technique called remote attestation before Step S101 or Step S102 illustrated in FIG. 4, that is, before starting the sequence. The verification of tampering may be bidirectional, or one may verify the other.

In the first and second example embodiments, examples are given in which the counterpart device 12a transmits software configuration information to the user device 12b, and the user device 12b inquires the certification authority for presence of a backdoor, based on the software configuration information.

Instead, the verification agent of the counterpart device 12a may inquire the certification authority for presence of a backdoor (the result of the backdoor inspection), based on the software configuration information, and the counterpart device 12a may transmit the information of presence of a backdoor to the user device 12b. Then, the user device 12b may permit a communication connection with the counterpart device 12a only when the information that no backdoor is contained is transmitted.

Third Example Embodiment

The configuration of a system according to a third example embodiment will be described.

Figure 8:
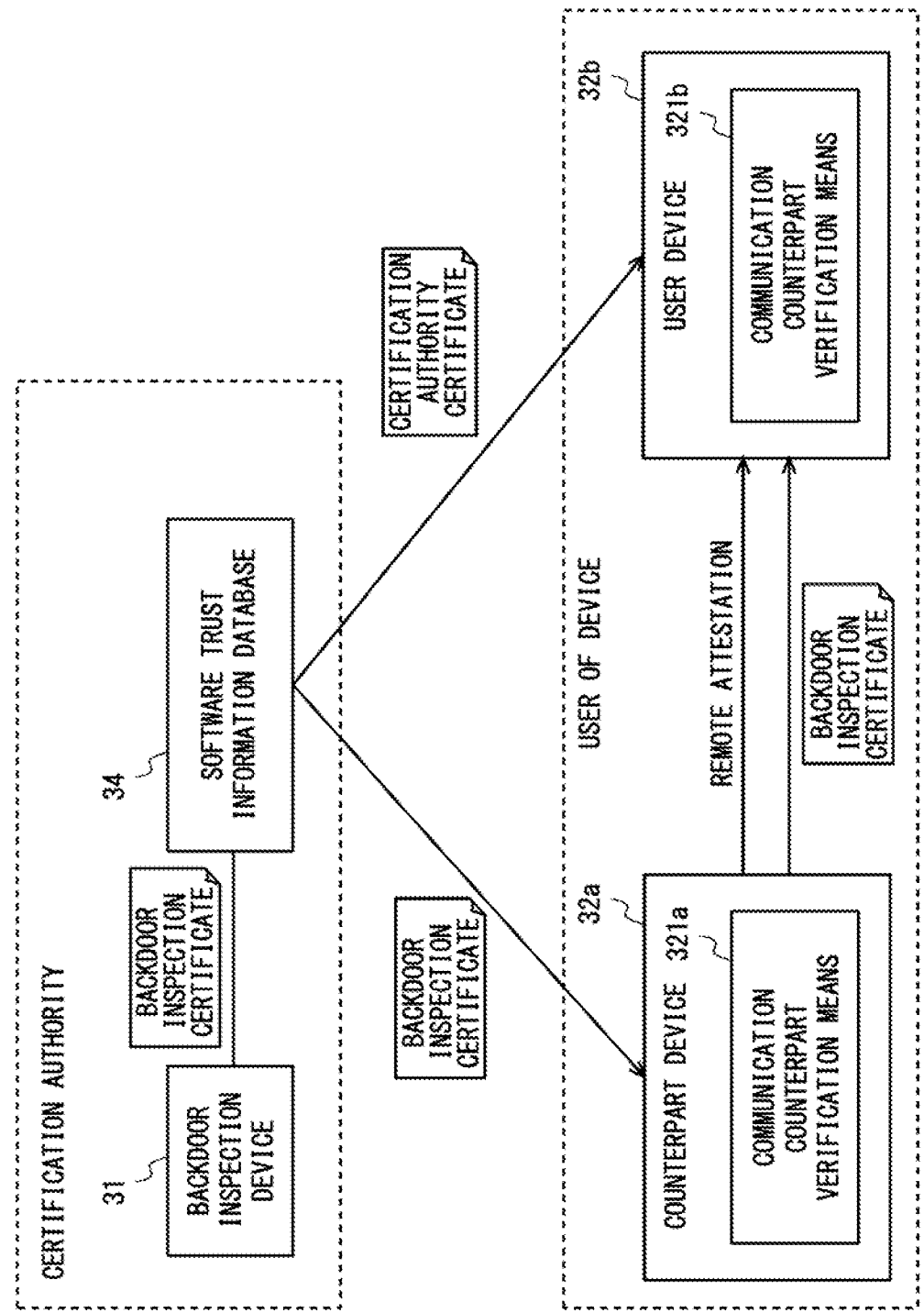
FIG. 8 is a block diagram illustrating a system according to a third example embodiment.

FIG. 8 is a block diagram illustrating the system according to the third example embodiment.

In the system 10 according to the first example embodiment, the user device 12b, which is the side to verify, receives a backdoor inspection certificate from the database 14 that stores the software trust information. In contrast, in the system 30 according to the third example embodiment, a user device 32b receives a backdoor inspection certificate from a database 34 via a counterpart device 32a, which is the side to be verified.

As illustrated in FIG. 3, the system 30 comprises a backdoor inspection device 31, a database 34, and a user device 32b. The backdoor inspection device 31 performs backdoor inspection on software. The database 34 registers a backdoor inspection certificate issued by the backdoor inspection device 31. The user device 32b verifies the communication counterpart device 32a, based on the backdoor inspection certificate.

The backdoor inspection device 31 includes a backdoor presuming means and a certificate issuance means. The backdoor presuming means of the backdoor inspection device 31 analyzes the function and structure of software, performs backdoor inspection on the software, and identifies a presumed code that is presumed to be a backdoor from the software.

The certificate issuance means of the backdoor inspection device 31 issues a backdoor inspection certificate that includes information about the backdoor inspection and information that associates the information about the backdoor inspection with the software.

The database 34 includes a registration means and a transmission means. The registration means of the database 34 registers the backdoor inspection certificate as trust information.

The transmission means of the database 34 transmits, as a backdoor inspection certificate, information about the backdoor inspection that includes the result of the backdoor inspection, based on the software configuration information that includes information of the software.

The user device 32b includes a communication means and a communication counterpart verification means. The communication means of the user device 32b receives the software configuration information of the software installed in the communication counterpart device 32a from the counterpart device 32a. The communication means of the user device 32b receives the backdoor inspection certificate that includes the result of the backdoor inspection associated to the software information from the database 34 via the counterpart device 32a.

The communication counterpart verification means of the user device 32b determines whether to permit communication with the counterpart device 32a, based on the received backdoor inspection certificate that includes the result of the backdoor inspection.

The communication means of the user device 32b communicates with the counterpart device 32a when the communication counterpart verification means of the user device 32b determines to permit communication with the counterpart device 32a.

The certification authority has a database 34. The communication means of the user device 32b receives a certification authority certificate from the certification authority. The certification authority certificate is a certificate that proves that the associated certification authority is trustworthy. The certification authority certificate includes a public key of the certification authority. The certification authority certificate may also include information of the certification authority such as the name, address, and contact information of the certification authority. The certification authority certificate may also include the signature of a trusted third party organization.

The communication counterpart verification means of the user device 32b may determine whether to permit communication with the counterpart device 32a, based on the certification authority certificate in addition to the backdoor inspection certificate that includes the result of backdoor inspection.

The operation of the system according to the third example embodiment will be described.

Figure 9:
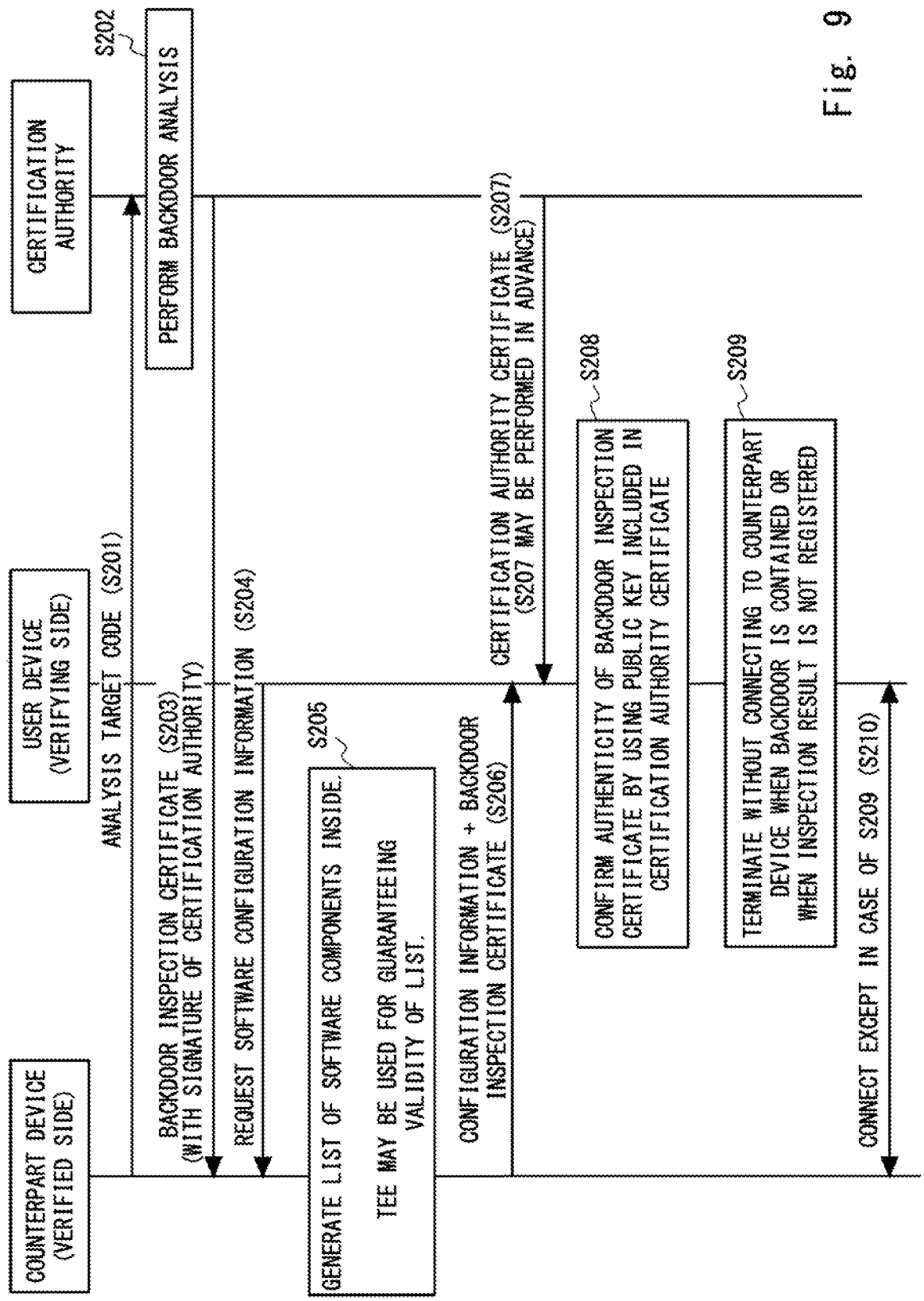
FIG. 9 is a sequence diagram illustrating the operation of the system according to the third example embodiment.

FIG. 9 is a sequence diagram illustrating the operation of the system according to the third example embodiment.

As illustrated in FIG. 9, the user device 32b identifies an analysis target code to be analyzed (Step S201).

The certification authority performs backdoor analysis (Step S202).

The certification authority transmits a backdoor inspection certificate with the signature of the certification authority to the counterpart device 32a. Note that the signature is generated in such a way that the signature can be verified by a public key included in the certification authority certificate (Step S203).

The user device 32b requests software configuration information that includes information of the software installed in the counterpart device 32a from the counterpart device 32a (Step S204).

The counterpart device 32a generates a list of software components inside the own device (Step S205). At this time, the list may be generated by using TEE in order to guarantee the validity of the generated list.

The counterpart device 32a transmits the software configuration information that includes the generated list and the backdoor inspection certificate that was received at Step S203 to the user device 32b (Step S206).

The user device 32b receives the certification authority certificate from the certification authority (Step S207). Note that the user device 32b may receive the certification authority certificate from the certification authority in advance.

The user device 32b confirms the authenticity of the backdoor inspection certificate by verifying the signature of the backdoor inspection certificate with a public key included in the certification authority certificate. When the authenticity of the backdoor inspection certificate is not ensured, the user device 32b terminates without connecting with the counterpart device 32a, or continues the processing after alerting the administrator of the user device 32b (Step S208).

When a backdoor is contained or the inspection result is not registered, the user device 32b terminates without connecting to the counterpart device 32a (Step S209).

When no backdoor is contained or the inspection result is registered, the user device 32b starts to communicate with the counterpart device 32a (Step S210).

Although, in the above operation, the user device 32b receives the certification authority certificate from the certification authority at Step S207, the user device 32b may instead receive the certification authority certificate from a trusted third party organization.

Figure 10:
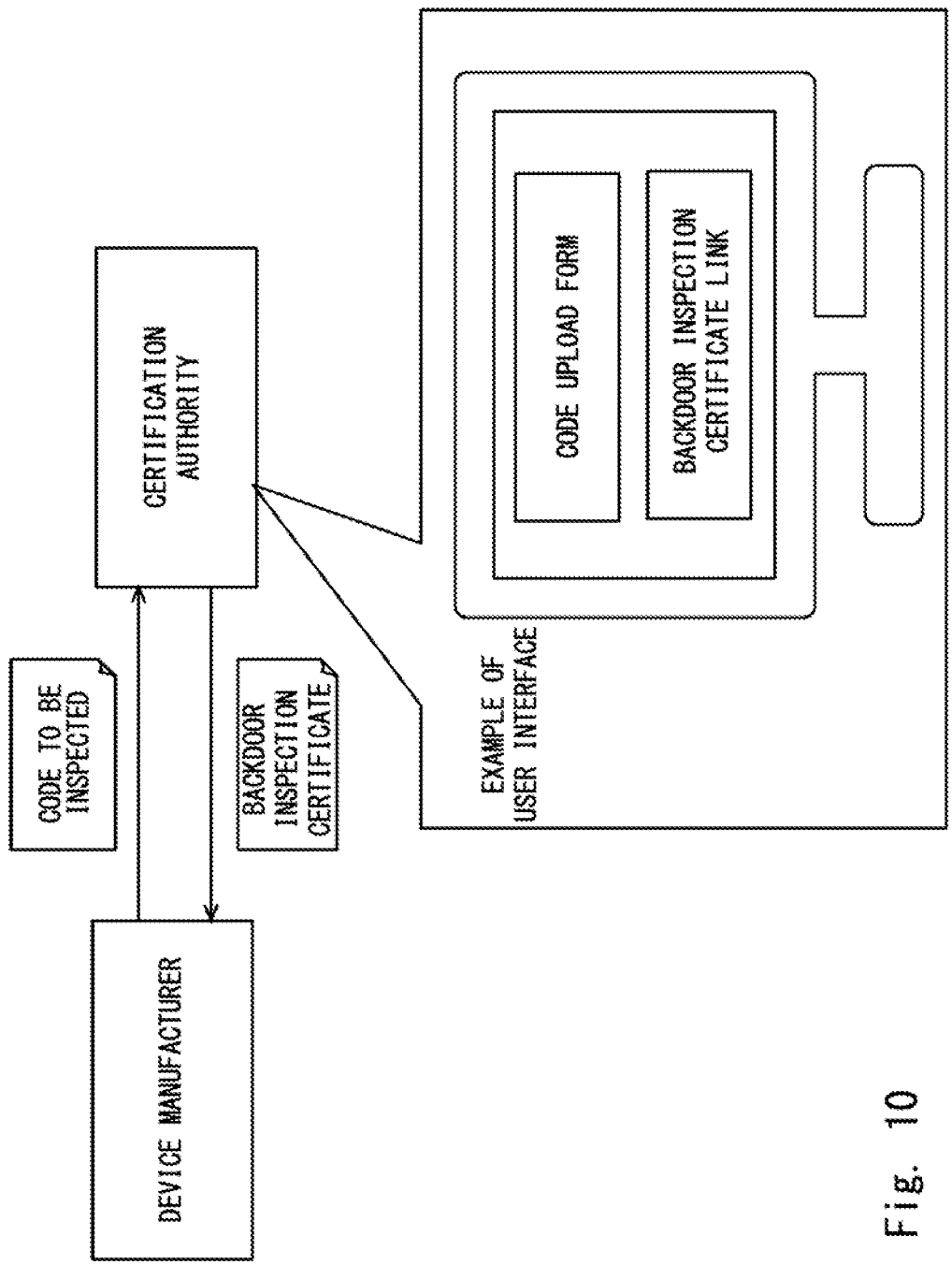
FIG. 10 is a block diagram illustrating processing up to issuance of a backdoor inspection certificate.

FIG. 10 is a block diagram illustrating processing up to issuance of a backdoor inspection certificate.

FIG. 10 illustrates online issuance of a backdoor inspection certificate using a user interface (UI).

As illustrated in FIG. 10, the certification authority requests a "code upload form" displayed on the user interface. In this example, a display is used as the user interface. The equipment manufacturer, in response, transmits a code to be inspected (a code to be analyzed) of equipment to the certification authority.

The certification authority issues a backdoor inspection certificate associated to the code to be inspected of the equipment to the equipment manufacturer online according to the "backdoor inspection certificate link" displayed on the display.

The equipment manufacturer can thus obtain a backdoor inspection certificate online.

Although the present invention has been described as a hardware configuration in the above example embodiments, the present invention is not limited thereto. The present invention can also be realized by causing a CPU (Central Processing Unit) to execute a computer program for processing of each component.

The above-described program can be stored by using any of various types of non-transitory computer-readable media and supplied to a computer. The non-transitory computer-readable media include various types of tangible storage media. Examples of non-transitory computer-readable media include magnetic storage media (specifically, flexible disks, magnetic tapes, and hard disk drives), magneto-optical storage media (specifically, magneto-optical disks), CD-ROM (Read Only Memory), CD-R, CD-R/W, semiconductor memory (specifically, mask ROM, PROM (Programmable ROM), EPROM (Erasable PROM)), flash ROM, and RAM (Random Access Memory). The program may also be supplied to a computer through any of various types of transitory computer-readable media. Examples of the transitory computer-readable media include electrical, optical, and electromagnetic waves. The transitory computer-readable media can supply the program to a computer via a wired communication path, such as an electric wire and an optical fiber, or a wireless communication path.

Although the present invention has been described with reference to the example embodiments described above, the present invention is not limited to the above. Various changes that can be understood by those skilled in the art can be made to the configuration and details of the present disclosure within the scope of the present invention.

Note that the present invention is not limited to the above-described example embodiments, and may be changed as appropriate without departing from the principle of the present invention.

Some or all of the above example embodiments may also be described as in the following Supplementary Notes, but are not limited to the following.

(Supplementary Note 1)
A backdoor inspection device including:
a backdoor presuming means for analyzing a function and a structure of software, performing backdoor inspection on the software, and identifying a presumed code that is presumed to be the backdoor from the software; and
a certificate issuance means for issuing a certificate that includes information about the backdoor inspection and information that associates the information about the backdoor inspection with the software.

(Supplementary Note 2)
The backdoor inspection device according to Supplementary Note 1, wherein
the certificate includes a result of the backdoor inspection, and
a result of the inspection includes location information of the presumed code in the software when the backdoor is contained in the software.

(Supplementary Note 3)
The backdoor inspection device according to Supplementary Note 1 or 2, wherein the certificate includes at least one of a hash value of the software, a name of the software, and a signature of the own device that performed the backdoor inspection.

(Supplementary Note 4)
The backdoor inspection device according to any one of Supplementary Notes 1 to 3, wherein the certificate includes at least one of a version of the own device that performed the backdoor inspection, an ID of an analyst who performed analysis by using the own device, and a name of the analyst.

(Supplementary Note 5)
The backdoor inspection device according to any one of Supplementary Notes 1 to 4, wherein
the certificate is embedded in the software, and
the software embedded with the certificate is downloaded to a user device that a user uses or to a storage medium.

(Supplementary Note 6)
A system including:
a backdoor inspection device configured to perform backdoor inspection on software;
a database configured to register a certificate issued by the backdoor inspection device; and
a user device configured to verify a counterpart device of communication, based on the certificate, wherein
the backdoor inspection device includes:
a backdoor presuming means for analyzing a function and a structure of software, performing the backdoor inspection on the software, and identifying a presumed code that is presumed to be the backdoor from the software; and
a certificate issuance means for issuing the certificate that includes information about the backdoor inspection and information that associates the information about the backdoor inspection with the software,
the database includes:
a registration means for registering the certificate as trust information; and
a transmission means for transmitting information about the backdoor inspection including a result of the backdoor inspection, based on software configuration information that includes information of the software,
the user device includes:
a communication means for receiving the software configuration information of the software installed in the counterpart device of communication from the counterpart device; and
a communication counterpart verification means for acquiring a result of the backdoor inspection associated to the information of the software from the database, and determining whether to permit communication with the counterpart device, based on the acquired result of the backdoor inspection, and
the communication means communicates with the counterpart device when the communication counterpart verification means determines to permit communication with the counterpart device.

(Supplementary Note 7)
The system according to Supplementary Note 6, wherein the communication counterpart verification means determines not to permit communication with the counterpart device when the backdoor is contained in the software, and determines to permit communication with the counterpart device when the backdoor is not contained in the software.

(Supplementary Note 8)
The system according to Supplementary Note 6 or 7, wherein
the communication counterpart verification means determines not to permit communication between the counterpart device and an external server when the backdoor is contained in the software, and determines to permit communication between the counterpart device and the external server when the backdoor is not contained in the software, and the counterpart device communicates with the server when the communication counterpart verification means determines to permit communication between the counterpart device and the server.

(Supplementary Note 9)

The system according to Supplementary Note 8, wherein the user device issues a first token indicating that the counterpart device has passed the backdoor inspection when the user device has confirmed that the backdoor is not contained in the software installed in the counterpart device, the counterpart device presents a second token to the server when the counterpart device accesses the server, and the server communicates with the counterpart device when the server has confirmed that the second token presented by the counterpart device is the first token issued by the user device.

(Supplementary Note 10)

The system according to Supplementary Note 8, wherein the user device notifies the server of an identifier for identifying the counterpart device when the user device has confirmed that the backdoor is not contained in the software installed in the counterpart device, and the server communicates only with a device having the notified identifier.

(Supplementary Note 11)

The system according to Supplementary Note 10, wherein the identifier includes at least one of an IP address and a MAC address.

(Supplementary Note 12)

The system according to Supplementary Note 6 or 7, further including a network switch configured to control in such a way that the counterpart device communicates only with the user device when the counterpart device is connected to a network, wherein the user device instructs the network switch to release restriction on communication of the counterpart device when the user device has confirmed that the backdoor is not contained in the software installed in the counterpart device.

(Supplementary Note 13)

The system according to Supplementary Note 6 or 7, further including a network switch configured to control in such a way that the counterpart device communicates only with the user device when the counterpart device is connected to the network, wherein the user device issues a token for releasing restriction on communication of the counterpart device to the counterpart device, the counterpart device transmits the token to the network switch, and the network switch receives the token and releases the restriction on communication of the counterpart device.

(Supplementary Note 14)

The system according to any one of Supplementary Notes 6 to 13, wherein the counterpart device has a verification agent for generating the software configuration information, and the user device verifies whether the verification agent has been tampered before receiving the software configuration information from the counterpart device.

(Supplementary Note 15)

The system according to any one of Supplementary Notes 6 to 14, wherein the user device acquires the certificate from the database, identifies the software that contains the backdoor, based on the certificate, and does not select a device in which the identified software is installed as the counterpart device of communication.

(Supplementary Note 16)

A system including:

a backdoor inspection device configured to perform backdoor inspection on software;

a database configured to register a certificate issued by the backdoor inspection device;

a user device configured to verify a counterpart device of communication, based on the certificate; and the counterpart device configured to communicate with the user device, wherein the backdoor inspection device includes:

a backdoor presuming means for analyzing a function and a structure of the software, performing the backdoor inspection on the software, and identifying a presumed code that is presumed to be the backdoor from the software; and a certificate issuance means for issuing the certificate that includes information about the backdoor inspection and information that associates the information about the backdoor inspection with the software, the database includes:

a registration means for registering the certificate as trust information; and a transmission means for transmitting information about the backdoor inspection including a result of the backdoor inspection, based on software configuration information that includes information of the software, the counterpart device includes:

an acquisition means for acquiring a result of the backdoor inspection associated to the software configuration information installed in the counterpart device from the database; and an output means for outputting the acquired result of the backdoor inspection to the user device, the user device includes:

a communication means for acquiring a result of the backdoor inspection from the counterpart device; and a communication counterpart verification means for determining whether to permit communication with the counterpart device, based on the acquired result of the backdoor inspection, and the communication means communicates with the counterpart device when the communication counterpart verification means determines to permit communication with the counterpart device.

(Supplementary Note 17)

A method including:

analyzing a function and a structure of software, performing backdoor inspection on the software, and identifying a presumed code that is presumed to be the backdoor from the software; and issuing a certificate that includes information about the backdoor inspection and information that associates the information about the backdoor inspection with the software.

(Supplementary Note 18)

A non-transitory computer-readable medium that stores a program that causes a computer to perform:

analyzing a function and a structure of software, performing backdoor inspection on the software, and identifying a presumed code that is presumed to be the backdoor from the software; and issuing a certificate that includes information about the backdoor inspection and information that associates the information about the backdoor inspection with the software.

(Supplementary Note 19)

A user device including:

a communication means for receiving, from a counterpart device of communication, software configuration information that includes information of software installed in the counterpart device, and receiving, from a database via the counterpart device, a result of backdoor inspection associated to the information of the software; and a communication counterpart verification means for determining whether to permit communication with the counterpart device, based on the received result of the backdoor inspection, wherein the communication means communicates with the counterpart device when the communication counterpart verification means determines to permit communication with the counterpart device.

(Supplementary Note 20)

A system including:

a backdoor inspection device configured to perform backdoor inspection on software;

a database configured to register a backdoor inspection certificate issued by the backdoor inspection device; and a user device configured to verify a counterpart device of communication, based on the backdoor inspection certificate, wherein the backdoor inspection device includes:

a backdoor presuming means for analyzing a function and a structure of the software, performing the backdoor inspection on the software, and identifying a presumed code that is presumed to be the backdoor from the software; and a certificate issuance means for issuing the backdoor inspection certificate that includes information about the backdoor inspection and information that associates the information about the backdoor inspection with the software, the database includes:

a registration means for registering the backdoor inspection certificate as trust information; and a transmission means for transmitting information about the backdoor inspection that includes a result of the backdoor inspection, based on software configuration information including information of the software, the user device includes:

a communication means for receiving, from the counterpart device of communication, the software configuration information of the software installed in the counterpart device, and receiving, from the database via the counterpart device, a result of the backdoor inspection associated to the information of the software; and a communication counterpart verification means for determining whether to permit communication with the counterpart device, based on the received result of the backdoor inspection, and the communication means communicates with the counterpart device when the communication counterpart verification means determines to permit communication with the counterpart device.

(Supplementary Note 21)

The system according to Supplementary Note 20, wherein the communication means receives, from a certification authority that has the database, a certification authority certificate of the certification authority, and the communication counterpart verification means determines whether to permit communication with the counterpart device, based on the certification authority certificate, in addition to the result of the backdoor inspection.

The present application claims the benefit of priority to International Patent Publication No. PCT/JP2019/031648 filed on Aug. 9, 2019, the entire disclosure of which is incorporated herein by reference in its entirety.

REFERENCE SIGNS LIST 10, 30 System
11, 31 Backdoor inspection device
111 Backdoor presuming means
1111 Function presuming means
1112 Structural analysis means
1113 Analysis means
112 Certificate issuance means
12b, 32b User device
12a, 32a Counterpart device
121, 121a, 121b, 321a, 321b Communication counterpart verification means
122 Communication means
13 Storage medium
14, 34 Database

What is claimed is:

1. A system comprising:

a backdoor inspection device configured to perform backdoor inspection on software;

a database configured to register a certificate issued by the backdoor inspection device; and a user device configured to verify a counterpart device of communication, based on the certificate, wherein the backdoor inspection device includes:

at least one first memory storing first instructions; and at least one first processor configured to execute the first instructions to:

analyze a function and a structure of the software, performing the backdoor inspection on the software, and identifying a presumed code that is presumed to be the backdoor from the software; and issue the certificate that includes information about the backdoor inspection and information that associates the information about the backdoor inspection with the software, the database includes:

at least one second memory storing second instructions; and at least one second processor configured to execute the second instructions to:

register the certificate as trust information; and transmit information about the backdoor inspection including a result of the backdoor inspection, based on software configuration information that includes information of the software, the user device includes:

at least one third memory storing third instructions; and at least one third processor configured to execute the third instructions to:

receive the software configuration information of the software installed in the counterpart device of communication from the counterpart device;

acquire a result of the backdoor inspection associated to the information of the software from the database;

determine whether to permit communication with the counterpart device, based on the acquired result of the backdoor inspection;

communicate with the counterpart device when having determined to permit communication with the counterpart device;

determine not to permit communication between the counterpart device and an external server when the backdoor is contained in the software; and determine to permit communication between the counterpart device and the external server when the backdoor is not contained in the software, and the counterpart device communicates with the server when the at least one third processor has determined to permit communication between the counterpart device and the server.

2. The system according to claim 1, wherein the at least one third processor is configured to determine not to permit communication with the counterpart device when the backdoor is contained in the software, and determine to permit communication with the counterpart device when the backdoor is not contained in the software.

3. The system according to claim 1, wherein
the user device issues a first token indicating that the counterpart device has passed the backdoor inspection when the user device has confirmed that the backdoor is not contained in the software installed in the counterpart device,
the counterpart device presents a second token to the server when the counterpart device accesses the server, and
the server communicates with the counterpart device when the server has confirmed that the second token presented by the counterpart device is the first token issued by the user device.

4. The system according to claim 1, wherein
the user device notifies the server of an identifier for identifying the counterpart device when the user device has confirmed that the backdoor is not contained in the software installed in the counterpart device, and
the server communicates only with a device having the notified identifier.

5. The system according to claim 4, wherein the identifier includes at least one of an IP address and a MAC address.

6. The system according to claim 1, further comprising a network switch configured to perform control in such a way that the counterpart device communicates only with the user device when the counterpart device is connected to a network,
wherein the user device instructs the network switch to release restriction on communication of the counterpart device when the user device has confirmed that the backdoor is not contained in the software installed in the counterpart device.

7. The system according to claim 1, further comprising a network switch configured to perform control in such a way that the counterpart device communicates only with the user device when the counterpart device is connected to the network, wherein
the user device issues a token for releasing restriction on communication of the counterpart device to the counterpart device,
the counterpart device transmits the token to the network switch, and the network switch receives the token and releases the restriction on communication of the counterpart device.

8. The system according to claim 1, wherein
the counterpart device has a verification agent for generating the software configuration information, and
the user device verifies whether the verification agent has been tampered before receiving the software configuration information from the counterpart device.

9. The system according to claim 1, wherein the user device acquires the certificate from the database, identifies the software that contains the backdoor, based on the certificate, and does not select a device in which the identified software is installed as the counterpart device of communication.

10. A system comprising:
a backdoor inspection device configured to perform backdoor inspection on software;
a database configured to register a certificate issued by the backdoor inspection device;
a user device configured to verify a counterpart device of communication, based on the certificate; and
the counterpart device configured to communicate with the user device, wherein
the backdoor inspection device includes:
at least one first memory storing first instructions; and
at least one first processor configured to execute the first instructions to:
analyze a function and a structure of the software, perform the backdoor inspection on the software, and identify a presumed code that is presumed to be the backdoor from the software; and
issue the certificate that includes information about the backdoor inspection and information that associates the information about the backdoor inspection with the software,
the database includes:
at least one second memory storing second instructions; and
at least one second processor configured to execute the second instructions to:
register the certificate as trust information; and
transmit information about the backdoor inspection including a result of the backdoor inspection, based on software configuration information that includes information of the software,
the counterpart device includes:
at least one third memory storing third instructions; and
at least one third processor configured to execute the third instructions to:
receive a result of the backdoor inspection associated to the software configuration information installed in the counterpart device from the database; and
output the acquired result of the backdoor inspection to the user device,
the user device includes:
at least one fourth memory storing fourth instructions; and
at least one fourth processor configured to execute the fourth instructions to:
acquire a result of the backdoor inspection from the counterpart device;
determine whether to permit communication with the counterpart device, based on the acquired result of the backdoor inspection and
communicate with the counterpart device when having determined to permit communication with the counterpart device.

11. A system comprising:
a backdoor inspection device configured to perform backdoor inspection on software;
a database configured to register a backdoor inspection certificate issued by the backdoor inspection device; and
a user device configured to verify a counterpart device of communication, based on the backdoor inspection certificate, wherein
the backdoor inspection device includes:
at least one first memory storing first instructions, and
at least one first processor configured to execute the first instructions to:
analyze a function and a structure of the software, perform the backdoor inspection on the software, and identify a presumed code that is presumed to be the backdoor from the software; and
issue the backdoor inspection certificate that includes information about the backdoor inspection and information that associates the information about the backdoor inspection with the software,
the database includes:
at least one second memory storing second instructions; and
at least one second processor configured to execute the second instructions to:
register the backdoor inspection certificate as trust information; and
transmit information about the backdoor inspection that includes a result of the backdoor inspection, based on software configuration information including information of the software,
the user device includes:
at least one third memory storing third instructions; and
at least one third processor configured to execute the third instructions to:
receive, from the counterpart device of communication, the software configuration information of the software installed in the counterpart device, and receive, from the database via the counterpart device, a result of the backdoor inspection associated to the information of the software;
receive, from a certification authority that has the database, a certification authority certificate of the certification authority;
determine whether to permit communication with the counterpart device, based on the received result of the backdoor inspection and based on the certification authority certificate; and
communicate with the counterpart device when having determined to permit communication with the counterpart device.

* * * * *